United States Patent Office 3,370,094
Patented Feb. 20, 1968

3,370,094
STABILIZED PARTIALLY HYDROGENATED
XYLENE - FORMALDEHYDE CONDENSA-
TION PRODUCTS AND PROCESS FOR OB-
TAINING SAME
Stephen M. Kovach, Highland, Ind., and Robert A. Sanford and David W. Young, Homewood, Ill., assignors to Sinclair Research Inc., New York, N.Y., a corporation of Delaware
No Drawing. Filed Sept. 10, 1965, Ser. No. 486,551
7 Claims. (Cl. 260—611)

ABSTRACT OF THE DISCLOSURE

Process of stabilizing xylene-formaldehyde condensation products of about 250 to 3000 molecular weight against further condensation by hydrogenation in liquid phase and by contact with molecular hydrogen in the presence of a nickel hydrogenation catalyst at a temperature of about 200 to 500° F. for a length of time sufficient to selectively saturate at least about 25% of the terminal tri-substituted benzene rings of the condensation product. Also partially hydrogenated xylene-formaldehyde condensation products stabilized against further condensation in accordance with this process.

---

This invention relates to a method of stabilizing xylene-formaldehyde condensation products against further condensation during use to undesirable higher molecular weight resins. More particularly, it relates to a method of selectively hydrogenating xylene-formaldehyde condensation products and to the hydrogenated products thereby produced.

Xylenes condense with formaldehyde in the presence of acid catalysts to form relatively short chain polymers. It is well known in the art that these low molecular weight condensation products, due to their high aromatic content, exhibit excellent compatibility with various other natural and synthetic resins and are widely used in combination therewith. Thus, xylene-formaldehyde condensation products are useful as plasticizers for polyvinyl chloride resins, for copolymers of polyvinyl chloride with other monomers, for ethyl cellulose resins, for benzyl cellulose resins, polystyrene resins, poly(vinylcarbazole) resins, coumarone-indene resins, etc. As plasticizers they can be used to reduce the softening point of the resins and increase their tackiness and, accordingly, are frequently employed in adhesive compositions. They are useful too in paint and laminating compositions such as phenolic varnishes in that they contribute flexibility, good dielectrical properties and good resistance to weather, oils and chemicals.

If xylene-formaldehyde condensation products are employed in media conducive to condensation reactions, however, such as high temperatures or in the presence of strong Lewis or Bronsted acids, an increase in molecular weight of the products occurs leading to incompatibility thereof with the aforementioned compatible resins. Obvious problems result due to this lessening of compatibility of the xylgene-formaldehyde resin: for example, when used as a plasticizer for resins such as polyvinyl-chloride in compositions subjected to high temperatures or acid media, the increasing molecular weight and, therefore, the growing insolubility of the xylene-formaldehyde product will cause the product to "bleed" to the surface of the composition.

The aforementioned condensation conditions may be present during the formulation as well as the subsequent use of compositions containing the xylene-formaldehyde resins, with the attendant disadvantages of higher viscosities of the mixes and limited areas of use of the product compositions. Thus, there exists a need for a method of stabilizing xylene-formaldehyde polymers against auto-condensation to higher molecular weight resins when subjected to the aforementioned conditions of temperature and acidity.

We have found that partial hydrogenation of the xylene-formaldehyde polymers will effect just such a stability. The hydrogenation esentially saturates at least about 25%, preferably at least about 50%, for instance up to about 80%, of the terminal tri-substituted rings of the polymer and few, if any, of the tetra-substituted rings are affected.

The xylene-formaldehyde polymerization products as produced by acid-catalyzed condensation techniques contain residual reactive sites on the terminal benzene rings. Common structures of the polymerizates of m-xylene, for example, with formaldehyde, based upon elemental analysis and instrumental analysis, may be represented by the following formulae, with the benzene rings numbered for identification purposes:

Formula I (4 to 3 ratio of formaldehyde to xylene):

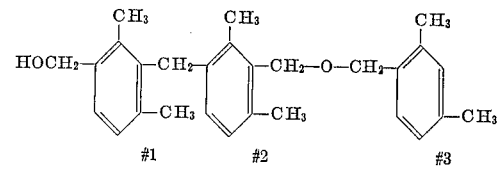

1   #2   #3

Formula II (at least 3 to 2 ratio of formaldehyde to xylene):

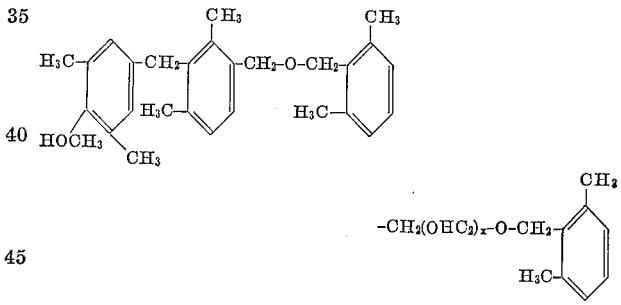

4   #5   #6   #7

On benzene rings #1 and #4, there are present reactive methylol groups which can undergo further condensations with other aromatic rings. In benzene rings #3 and #7 are such reactive centers for condensation with methylol groups. Thus, if either of these resins is employed in a media conducive to condensation reactions, an increase in molecular weight of the resin may occur due to the reaction of the methylol group of rings #1 or #4 with rings #3 or #7 of another molecule.

A method of eliminating this reactivity is by hydrogenation of rings #3 and #7. We have found that a tetra-substituted aromatic ring will not undergo hydrogenation in the liquid phase in the presence of a nickel catalyst whereas less substituted aromatic rings are readily hydrogenated. As shown, for example in the above Formula I, rings #1 and #2 are tetra-substituted and ring #3 is tri-substituted. Thus, in nickel-catalyzed, liquid phase hydrogenation ring #3 can be saturated with little, if any, hydrogenation of rings #1 and #2, resulting in a stable xylene-formaldehyde resin no longer subject to further condensation, as shown in the following structural formula:

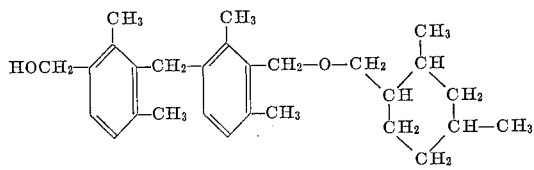

According to the method of this invention, the polymers which may be stabilized by hydrogenation are any of the condensation products or ortho, meta or para-xylene, or mixtures thereof, with formaldehyde. The preferred isomer is meta-xylene. The aldehyde, of course, may be supplied by either formaldehyde or paraformaldehyde. The molar ratio of xylene to aldehyde may vary from 0.1 to 10; preferably the reactants will be condensed in about 0.5 to 2/1 molar ratio. Methods of preparing the initial xylene-formaldehyde condensation product are known, among which may be mentioned bulk or solution polymerization in the presence of acidic catalysts such as hydrocarbon sulfonic acid, dilute sulfuric acid, $ZnCl_2$ in acetic acid, formic acid, ferric chloride, boron trifluoride, acidic clays, etc. Various reaction temperatures are known to be operable; usually a temperature between about 10° and 145° C., is preferred. Xylene-formaldehyde condensation products having molecular weights of about 250 to 3,000, ranging from low molecular weight oils to high molecular weight solids, are preferred for the process of the present invention.

As previously mentioned, the hydrogenation, to be selective, must be conducted in the presence of a nickel-containing catalyst with the resin in liquid phase. Various nickel-containing catalysts with good hydrogenation properties may be used, for instance, nickel oxide, Raney nickel, etc. An especially good catalyst for the process of this invention is nickel oxide supported on silica, e.g., kieselguhr. The catalysts often contain at least about 10% nickel.

Similarly, solvents which are inert with respect to the xylene-formaldehyde polymer, the catalyst and the hydrogen under the temperatures and pressure of the process may be employed. Suitable solvents include tetrahydrofuran and dimethyl formamide. Any suitable ratio of resin to solvent may be employed, and preferably from about 0.15 to 3.5 parts by weight of resin for each one part of solvent will be used.

The hydrogenation may be conducted in any suitable equipment either batchwise or continuously. Suitable hydrogenation conditions in accordance with this invention include temperatures of about 200 to 500° F. Other reaction conditions are often pressures of about 200 to 2000 pounds per square inch gauge, liquid hourly space velocities (LHSV), i.e., the volume of feed per volume of catalyst per hour, of about 0.1 to 5 and molar ratios of hydrogen to polymer of about 2 to 50.

EXAMPLE

A xylene-formaldehyde resin having a molecular weight of about 1500 prepared by a phosphoric acid catalyzed condensation of an equimolar mixture of formaldehyde and residual xylenes (65 to 75% meta), was dissolved in tetrahydrofuran in a weight ratio of resin to solvent of 1 to 2. A flow-type reactor was charged with 200 ml. of 60% NiO on kieselguhr catalyst. The resin-solvent feed was charged to the reactor and hydrogen admitted at a continual pressure of 900 p.s.i.g. The rate of feed of hydrogen and resin and extraction of gas and liquid was controlled so as to obtain a liquid hourly space velocity of 0.24 and a molar ratio of hydrogen to polymer of 9 to 1.

An analysis of the treated polymer by nuclear magnetic resonance indicated that 68% of the unsaturation in the tri-substituted terminal benzene rings of the polymer was hydrogenated; 83% of the hydrogen admitted to the reactor was consumed in the process. Before hydrogenation, the xylene-formaldehyde resin was characterized by an aldehyde odor and a yellow to brown color. The hydrogenated product was odorless and clear or very light yellow in color.

This experiment was performed in a stainless steel Universal one-inch I.D. reactor heated by a radiant heat furnace. The temperature of the reactor was controlled by Fenwal thermostats and the temperature of the catalyst bed was measured by means of chromel-alumel thermocouples located throughout the bed. The hydrocarbon feed was charged to the reactor by means of a Lapp pump. The diluent gas, hydrogen, was metered to the reactor through a Fischer-Porter armored rotameter. The liquid product was separated from the effluent gas in a Jerguson liquid-level gauge and then released to atmospheric pressure at room temperature. The effluent gas was measured by means of an American wet-test meter. The liquid products were submitted for distillation to strip the solvent from the resin.

The hydrogenated resins produced by the process of this invention have the same compatibility toward other resins and the same uses in paints, adhesives, etc., as their parent polymers. However, the hydrogenated resins can be employed in regions of high temperatures and strong Lewis and Bronstead acids without undergoing significant condensation reactions and yielding higher molecular weight insoluble polymers.

We claim:
1. A process of stabilizing a xylene-formaldehyde condensation product of about 250 to 3000 molecular weight against further condensation which consists essentially of hydrogenating said product in liquid phase by contact with molecular hydrogen in the presence of a nickel hydrogenation catalyst at a temperature of about 200 to 500° F. for a length of time sufficient to selectively saturate at least about 25% of the terminal tri-substituted benzene rings of said condensation product.

2. The process of claim 1 wherein said xylene-formaldehyde condensation product is hydrogenated for a length of time sufficient to selectively saturate at least about 50% of the terminal tri-substituted rings.

3. The process of claim 2 wherein the hydrogenation is conducted at a pressure of about 200 to 2000 p.s.i.g., and a molar ratio of hydrogen to said condensation product of about 2 to 50.

4. The process of claim 3 wherein said nickel hydrogenation catalyst is a catalyst consisting essentially of nickel oxide supported on silica.

5. The process of claim 4 wherein the hydrogenation is conducted using tetrahydrofuran as a solvent.

6. The product produced by the process of claim 1.
7. The product produced by the process of claim 2.

References Cited

Walker, Formaldehyde (1953), pp. 343–344.

BERNARD HELFIN, *Primary Examiner*.